(12) United States Patent
Lee et al.

(10) Patent No.: US 9,209,862 B2
(45) Date of Patent: Dec. 8, 2015

(54) APPARATUS AND METHOD FOR NEAR FIELD COMMUNICATION IN ULTRA WIDEBAND (UWB)

(71) Applicant: Electronics and Telecommunications Research Institute, Daejeon (KR)

(72) Inventors: Woo Yong Lee, Daejeon (KR); Jin Kyeong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 14/021,220

(22) Filed: Sep. 9, 2013

(65) Prior Publication Data

US 2014/0072016 A1 Mar. 13, 2014

(30) Foreign Application Priority Data

Sep. 10, 2012 (KR) .......................... 10-2012-0099811
Aug. 22, 2013 (KR) .......................... 10-2013-0099813

(51) Int. Cl.
*H04B 1/00* (2006.01)
*H04B 1/7163* (2011.01)

(52) U.S. Cl.
CPC .................................. *H04B 1/71635* (2013.01)

(58) Field of Classification Search
CPC ..... H04B 1/707; H04B 1/7117; H04B 1/7073
USPC ............ 375/146, 343; 342/378, 387; 398/154
See application file for complete search history.

(56) References Cited

U.S. PATENT DOCUMENTS

| | | | |
|---|---|---|---|
| 2009/0285339 A1* | 11/2009 | Zhang et al. ................... | 375/343 |
| 2010/0271263 A1* | 10/2010 | Moshfeghi ..................... | 342/378 |
| 2011/0064420 A1* | 3/2011 | Rajagopal et al. ............. | 398/154 |
| 2013/0044789 A1* | 2/2013 | Choi .............................. | 375/146 |

\* cited by examiner

*Primary Examiner* — Daniel Washburn
*Assistant Examiner* — Fitwi Hailegiorgis
(74) *Attorney, Agent, or Firm* — Rabin & Berdo, P.C.

(57) ABSTRACT

Disclosed is an apparatus and method for near field communication in an ultra wideband (UWB). An apparatus for near field communication in an UWB may include a determiner to determine the number of repetitions of a first sequence in each of n preambles, n denoting a natural number, and a processor to generate n short preambles by repeatedly arranging the first sequence based on the determined number of repetitions, and to generate the n preambles by arranging a long preamble with respect to each of the generated n short preambles.

13 Claims, 6 Drawing Sheets

| Design variable | Value |
|---|---|
| $N_{SD}$: Number of data subcarriers | 336 |
| $N_{SP}$: Number of pilot subcarriers | 16 |
| $N_{DC}$: Number of DC subcarriers | 3 |
| $N_{ST}$: Total Number of subcarriers | 355 |
| $N_{SR}$: Number of subcarriers occupying half of the overall BW | 177 |
| $\Delta_F$: subcarrier frequency spacing | 1.056875MHz(540MHz/512) |
| $F_s$: OFDM sample rate | 660MHz |
| $F_c$: SC chip rate | 440MHz = ⅔ $F_s$ |
| $T_s$: OFDM Sample Time | 1.52ns=1/$F_s$ |
| $T_c$: SC Chip Time | 2.28ns=1/$F_c$ |
| $T_{DFT}$: IDFT/DFT period | 0.776usec |
| $T_{GI}$: Guard Interval duration | 193.6ns= $T_{DFT}$/4 |
| $T_{seq}$ | 290.8ns=128×$T_c$ |
| $T_{STF}$: Detection sequence duration | 2617.2ns=9× $T_{seq}$<br><br>1454ns=5× $T_{seq}$<br><br>872.4ns=3× $T_{seq}$<br><br>581.6ns=2× $T_{seq}$ |
| $T_{CE}$: Channel Estimation sequence duration | 2620ns=9×$T_{seq}$ |
| $T_{SYM}$: Symbol Interval | 0.968μs= $T_{DFT}$+$T_{GI}$ |
| $T_{HEADER}$: Header Duration | 0.968 μs=$T_{SYM}$(OFDM)<br><br>2.328μs =2×512× $T_c$ (SC) |
| $F_{CCP}$: Control PHY chip rate | 440MHz |
| $T_{Data}$ | $N_{SYM}$×$T_{SYM}$ (OFDM)<br><br>($N_{BLKS}$×512+64)×$T_c$ (SC) |

APPARATUS AND METHOD FOR NEAR FIELD COMMUNICATION IN ULTRA WIDEBAND (UWB)

CROSS-REFERENCE TO RELATED APPLICATIONS

This application claims the priority benefit of Korean Patent Application No. 10-2012-0099811, filed on Sep. 10, 2012, and Korean Patent Application No. 10-2013-0099813, filed on Aug. 22, 2013 in the Korean Intellectual Property Office, the disclosures of which are incorporated herein by reference.

BACKGROUND

1. Field of the Invention

Embodiments of the present invention relate to an apparatus and method for near field communication (NFC) in an ultra wideband (UWB) that may generate a preamble available in an UWB.

2. Description of the Related Art

Due to a great amount of data traffic, frequency use of a near field communication (NFC) network in a local area is predicted to be saturated.

Accordingly, a new NFC technology using a relatively infrequently used ultra wideband (UWB) frequency is required.

However, a wireless local area network (WLAN) transmission technology of an existing millimeter wave band, for example, 60 GHz uses a frequency bandwidth of 2.16 GHz, whereas an UWB frequency band divides and thereby uses a frequency bandwidth based on a unit of 528 MHz. Therefore, the WLAN transmission technology using the millimeter wave band, for example, 60 GHz may not be applied as is in an UWB frequency band environment.

For example, a millimeter wave band based preamble scheme used to recover data in a poor frequency environment may be significantly inefficient to be used in an UWB frequency band environment.

SUMMARY

An aspect of the present invention is to support smooth near field communication (NFC) in an ultra wideband (UWB) by generating a preamble available in an UWB, transmitting the generated preamble to a mobile terminal, and enabling the mobile terminal to recover data based on the preamble.

According to an aspect of the present invention, there is provided an apparatus for NFC in an ultra wideband (UWB), the apparatus including a determiner to determine the number of repetitions of a first sequence in each of n preambles, n denoting a natural number, and a processor to generate n short preambles by repeatedly arranging the first sequence based on the determined number of repetitions, and to generate the n preambles by arranging a long preamble with respect to each of the generated n short preambles.

According to another aspect of the present invention, there is provided a method for NFC in an UWB, the method including determining the number of repetitions of a first sequence in each of n preambles, n denoting a natural number, and generating n short preambles by repeatedly arranging the first sequence based on the determined number of repetitions, and generating the n preambles by arranging a long preamble with respect to each of the generated n short preambles.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an apparatus and method for near field communication (NFC) in an ultra wideband (UWB) according to embodiments of the present invention will be described with reference to the accompanying drawings.

Figure 1:
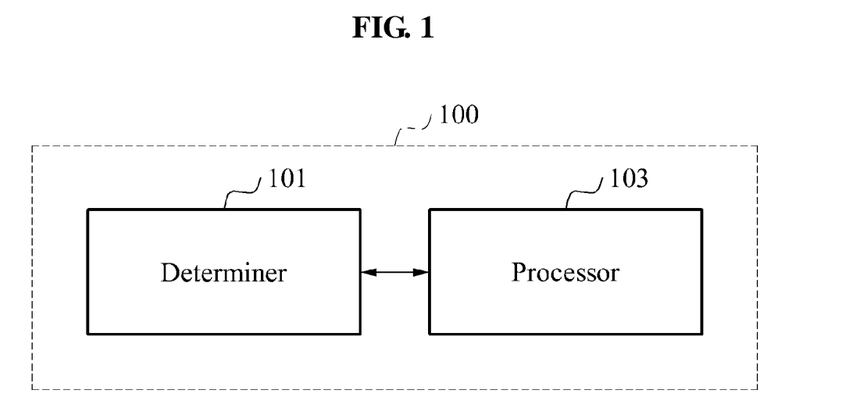
FIG. 1 is a block diagram illustrating a configuration of an apparatus for near field communication (NFC) in an ultra wideband (UWB) according to an embodiment of the present invention.

FIG. 1 is a block diagram illustrating a configuration of an apparatus 100 for NFC in an UWB according to an embodiment of the present invention.

Referring to FIG. 1, the NFC apparatus 100 may include a determiner 101 and a processor 103.

The determiner 101 may determine the number of repetitions of a first sequence in each of n preambles. Here, n denotes a natural number. The determiner 101 may differently determine the number of repetitions of the first sequence in each of the n preambles by sequentially decreasing the number of repetitions. For example, if n=4, the determiner 101 may determine the number of repetitions of the first sequence in a first preamble as "eight times", may determine the number of repetitions of the first sequence in a second preamble as "four times", may determine the number of repetitions of the first sequence in a third preamble as "twice", and may determine the number of repetitions of the first sequence in a fourth preamble as "once".

The determiner 101 may determine the number of repetitions of the first sequence in each of the n preambles, based on a channel state, for example, receiving sensitivity.

The processor 103 may generate n short preambles by repeatedly arranging the first sequence based on the determined number of repetitions, and may generate the n preambles by arranging a long preamble with respect to each of the generated n short preambles. Here, the short preamble may be a short training field (STF) and the long preamble may be a channel estimation field (CEF).

The processor 103 may generate a short preamble by further arranging a second sequence having a phase opposite to a phase of the first sequence. The processor 103 may arrange the second sequence between the first sequence and the long preamble.

For example, the processor 103 may generate the first frame by repeatedly arranging eight first sequences and by further arranging the second sequence and the long preamble to be next to the eight first sequences. The processor 103 may generate the second preamble by repeatedly arranging four first sequences, and by further arranging the second sequence and the long preamble to be next to the four first sequences. The processor 103 may generate the third preamble by repeatedly arranging two first sequences and by further arranging the second sequence and the long preamble to be next to the two first sequences. Also, the processor 103 may generate the fourth preamble by arranging a single first sequence and by further arranging the second sequence and the long preamble to be next to the first sequence.

The processor 103 may sequentially transmit the generated n preambles to a mobile terminal. The processor 103 may sequentially transmit, to the mobile terminal, the first preamble, the second preamble, the third preamble, and the fourth preamble in, for example, a bandwidth of 540 MHz, 1080 MHz, or 1620 MHz.

The NFC apparatus 100 may generate a preamble for applying a multiple input multiple output (MIMO) communication scheme using m antennas, and may transmit the generated preamble to the mobile terminal. Here, m denotes a natural number.

Figure 2:
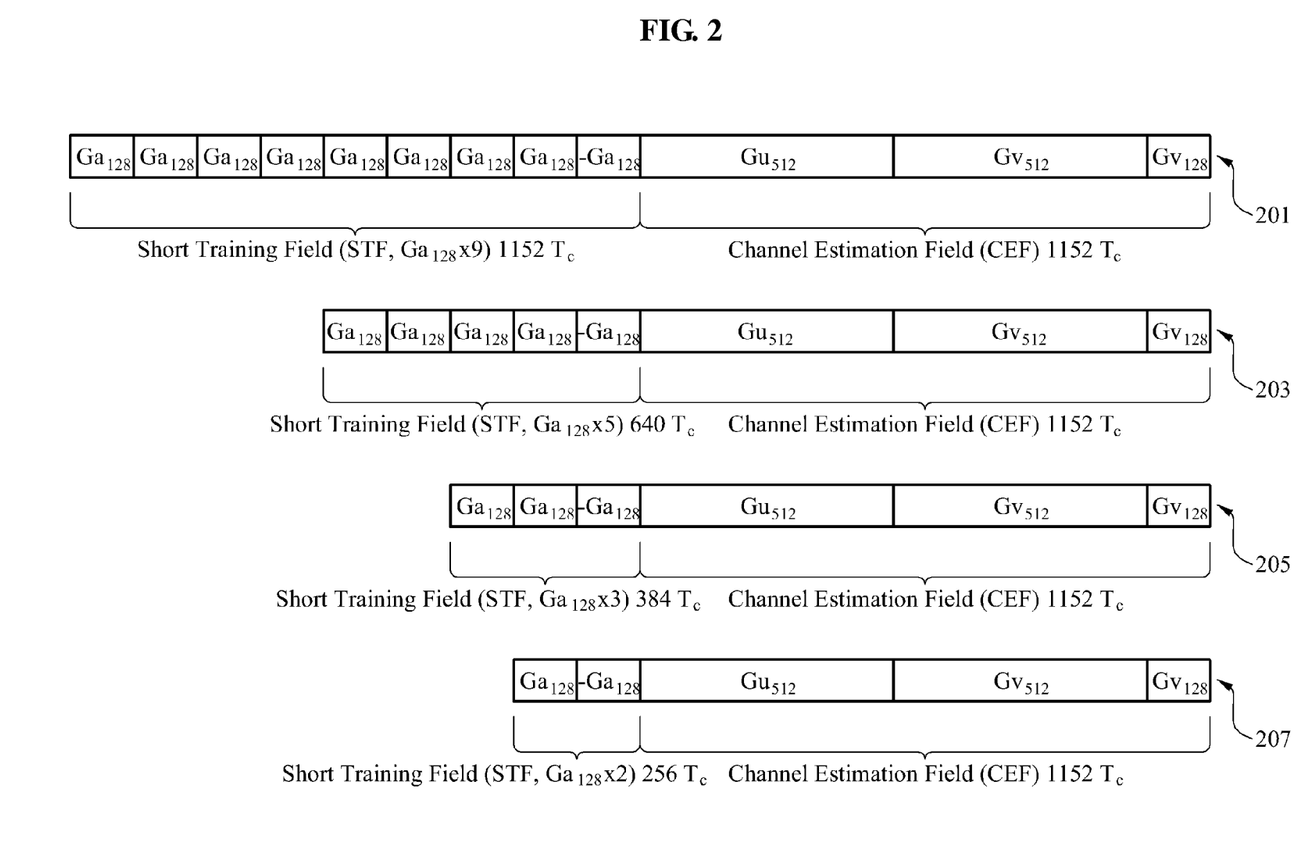
FIG. 2 illustrates an example of a format of a preamble generated in an apparatus for NFC in an UWB according to an embodiment of the present invention.

FIG. 2 illustrates an example of a format of a preamble generated in an apparatus for NFC in an UWB according to an embodiment of the present invention.

Referring to FIG. 2, the NFC apparatus may generate a plurality of preambles having different lengths. Here, the NFC apparatus may generate the plurality of preambles by including a short preamble and a long preamble. The short preamble may include a first sequence and a second sequence having a phase opposite to a phase of the first sequence. Here, an interval of each of the first sequence and the second sequence may be, for example, 128 T. An interval of the short preamble may vary based on the number of repetitions of the first sequence, and an interval of the long preamble may be, for example, 1152 T.

For example, the NFC apparatus may generate a first preamble 201 that includes a short preamble, including eight first sequences and a single second sequence, and a long preamble. The NFC apparatus may generate a second preamble 203 that includes a short preamble, including four first sequences and a single second sequence, and a long preamble. The NFC apparatus may generate a third preamble 205 that includes a short preamble, including two first sequences and a single second sequence, and a long preamble. Also, the NFC apparatus may generate a fourth preamble 207 that includes a short preamble, including a single first sequence and a single second sequence, and a long preamble.

Figure 3:
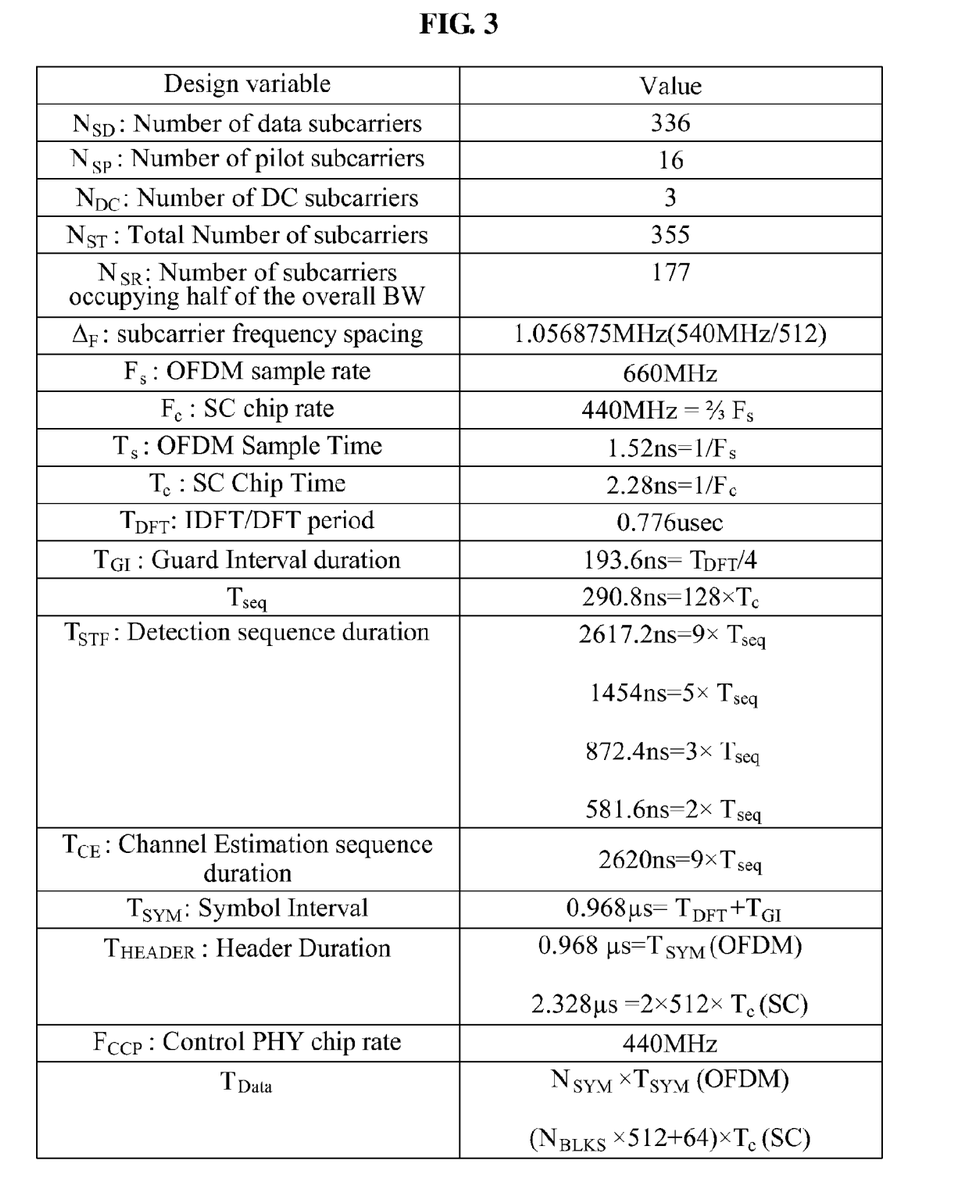
FIG. 3 illustrates an example of setting a timing design variable associated with a transmission in an apparatus for NFC in an UWB according to an embodiment of the present invention.

FIG. 3 illustrates an example of setting a timing design variable associated with a transmission in an apparatus for NFC in an UWB according to an embodiment of the present invention.

Referring to FIG. 3, the NFC apparatus may set a timing design variable associated with a transmission in the case of using, for example, a channel bandwidth of 528 MHz. Here, the NFC apparatus may set a detection sequence duration $T_{STF}$ as 2617.2 ns=9×Tseq, 1454 ns=5×Tseq, 872.4 ns=3× Tseq, and 581.6 ns=2×Tseq, and may set a channel estimation sequence duration $T_{CE}$ as 2620 ns=9×Tseq.

Figure 4:
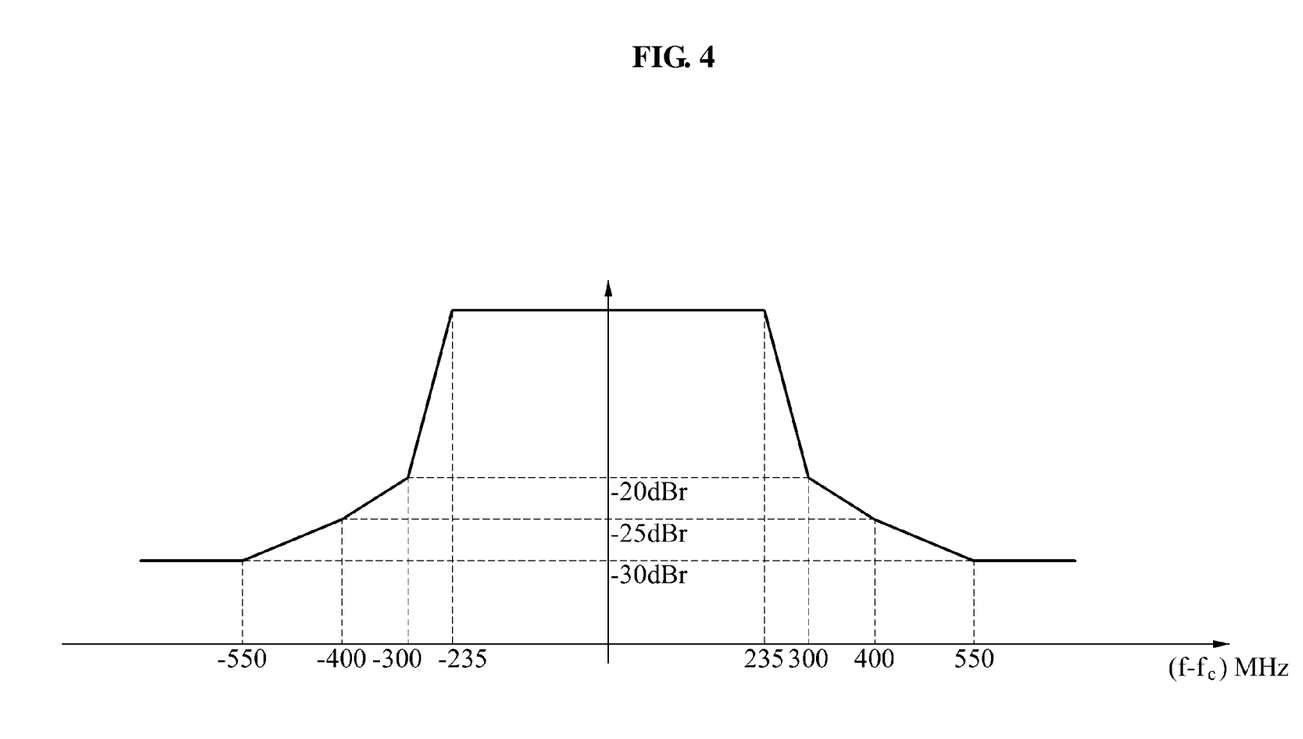
FIG. 4 illustrates an example of a frequency mask used in an apparatus for NFC in an UWB according to an embodiment of the present invention.

FIG. 4 illustrates an example of a frequency mask used in an apparatus for NFC in an UWB according to an embodiment of the present invention.

Referring to FIG. 4, in the case of using, for example, a channel bandwidth of 528 MHz, the NFC apparatus may transmit, to a mobile terminal, a signal that passes by applying, to a plurality of preambles, a frequency mask for making a frequency between −550 MHz and 550 MHz pass.

Figure 5:
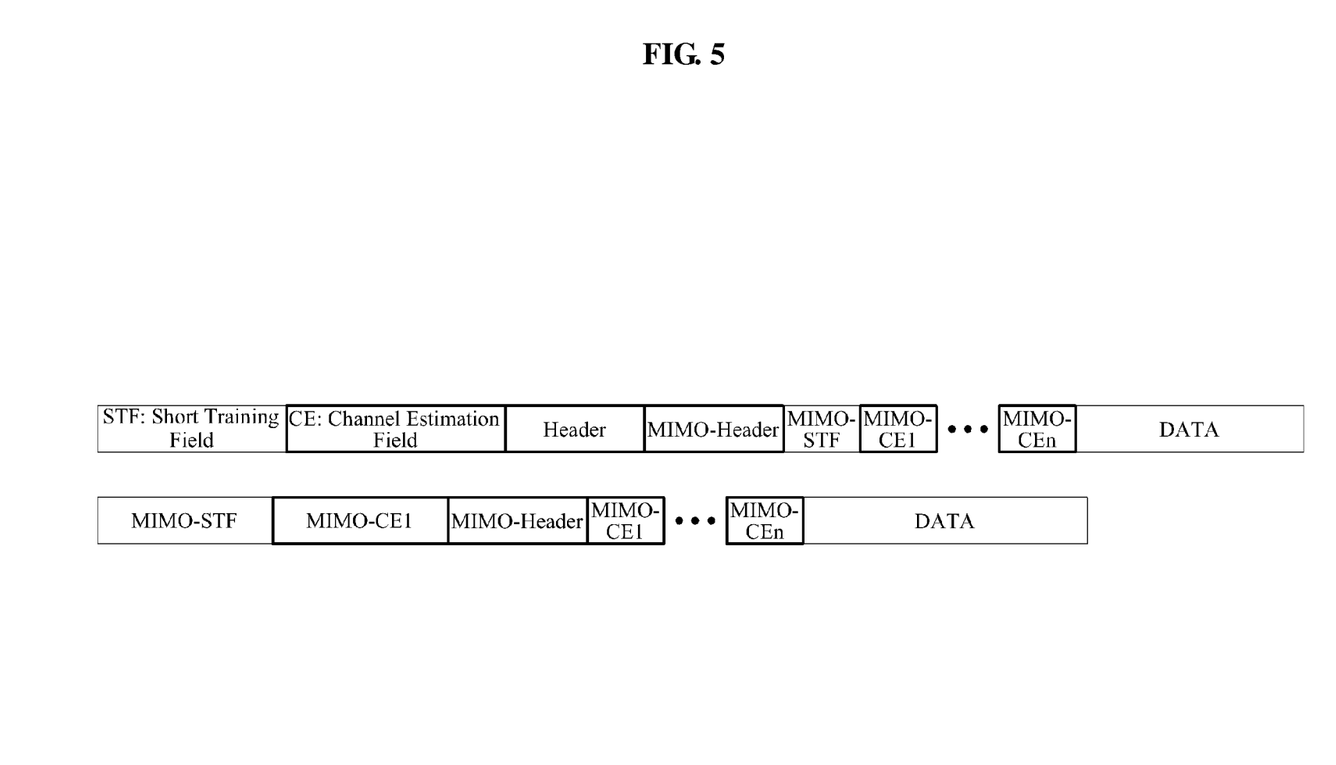
FIG. 5 illustrates another example of a format of a preamble generated in an apparatus for NFC in an UWB according to an embodiment of the present invention.

FIG. 5 illustrates another example of a format of a preamble generated in an apparatus for NFC in an UWB according to an embodiment of the present invention.

Referring to FIG. 5, the NFC apparatus may generate a preamble for applying a MIMO communication scheme using a plurality of antennas.

For example, the NFC apparatus may generate a preamble that includes an STF, a CEF, a header field, a MIMO-Header field, a MIMO-STF, $MIMO-CE_1$, . . . , MIMO-CEn, and a DATA field, or may generate a preamble that includes a MIMO-STF, $MIMO-CE_{1,a}$ MIMO-Header, $MIMO-CE_1$, . . . , MIMO-CEn, and a DATA field.

Figure 6:
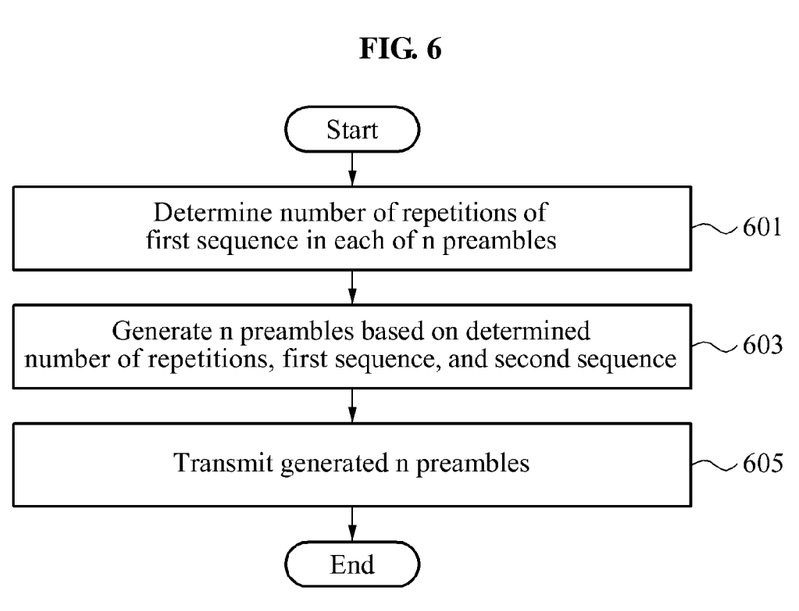
FIG. 6 is a flowchart illustrating a method for NFC in an UWB according to an embodiment of the present invention.

FIG. 6 is a flowchart illustrating a method for NFC in an UWB according to an embodiment of the present invention.

Referring to FIG. 6, in operation 601, an NFC apparatus may determine the number of repetitions of a first sequence in each of n preambles. Here, n denotes a natural number. In this instance, the determiner 101 may differently determine the number of repetitions of the first sequence in each of the n preambles by sequentially decreasing the number of repetitions. For example, if n=4, the determiner 101 may determine the number of repetitions of the first sequence in a first preamble as "eight times", may determine the number of repetitions of the first sequence in a second preamble as "four times", may determine the number of repetitions of the first sequence in a third preamble as "twice", and may determine the number of repetitions of the first sequence in a fourth preamble as "once".

The NFC apparatus may determine the number of repetitions of the first sequence in each of the n preambles, based on a channel state, for example, receiving sensitivity.

In operation 603, the NFC apparatus may generate n preambles based on the determined number of repetitions, the first sequence, and the second sequence. The NFC apparatus may generate n short preambles by repeatedly arranging the first sequence based on the determined number of repetitions, and may generate the n preambles by arranging a long preamble with respect to each of the generated n short preambles.

The NFC apparatus may generate a short preamble by further arranging a second sequence having a phase opposite to a phase of the first sequence. The NFC apparatus may arrange the second sequence between the first sequence and the long preamble.

For example, the NFC apparatus may generate the first frame by repeatedly arranging eight first sequences and by further arranging the second sequence and the long preamble to be next to the eight first sequences. The NFC apparatus may generate the second preamble by repeatedly arranging four first sequences, and by further arranging the second sequence and the long preamble to be next to the four first sequences. The NFC apparatus may generate the third preamble by repeatedly arranging two first sequences and by further arranging the second sequence and the long preamble to be next to the two first sequences. Also, the NFC apparatus may generate the fourth preamble by arranging a single first sequence and by further arranging the second sequence and the long preamble to be next to the first sequence.

In operation 605, the NFC apparatus may sequentially transmit the generated n preambles to a mobile terminal. The NFC apparatus may sequentially transmit, to the mobile terminal, the first preamble, the second preamble, the third preamble, and the fourth preamble in, for example, a bandwidth of 540 MHz.

According to embodiments of the present invention, it is possible to support smooth NFC in an UWB by generating a preamble available in the UWB, transmitting the generated preamble to a mobile terminal, and enabling the mobile terminal to recover data based on the preamble.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for near field communication in an ultra wideband (UWB), the apparatus comprising:
a determiner configured to determine, for each of a series of n preambles, a number of repetitions of a first sequence in said each preamble, n denoting a natural number larger than two, the determined numbers of repetitions being sequentially decreased for the series of n preambles; and
a processor configured
to generate the series of n preambles by, for each of the n preambles,
repeatedly arranging the first sequence in accordance with the number of repetitions determined for said each preamble, to thereby generate a short preamble, and
arranging a long preamble with the generated short preamble.

2. The apparatus of claim 1, wherein the processor sequentially transmits the generated n preambles to a mobile terminal.

3. The apparatus of claim 1, wherein the processor generates the short preamble by further arranging a second sequence having a phase opposite to a phase of the first sequence.

4. The apparatus of claim 3, wherein the processor arranges the second sequence between the repeated first sequences and the long preamble.

5. The apparatus of claim 1, wherein the determiner determines the number of repetitions of the first sequence in each of the n preambles based on a channel state.

6. The apparatus of claim 1, wherein the short preamble is a short training field (STF) and the long preamble is a channel estimation field (CEF).

7. The apparatus of claim 1, wherein the number of repetitions for each preamble in the series of n preambles is twice as large as the number of repetitions for its immediate subsequent preamble in the series of n preambles.

8. A method for near field communication in an ultra wideband (UWB), the method comprising:
determining, for each of a series of n preambles, a number of repetitions of a first sequence in said each preamble, n denoting a natural number larger than two, the determined numbers of repetitions being sequentially decreased for the series of n preambles; and
generating the series of n preambles by, for each of the n preambles,
repeatedly arranging the first sequence in accordance with the number of repetitions determined for said each preamble, to thereby generate a short preamble, and
arranging a long preamble with the generated short preamble.

9. The method of claim 8, wherein the method further comprises sequentially transmitting the generated n preambles to a mobile terminal.

10. The method of claim 8, wherein the generating the series of n preambles comprises generating the short preamble by further arranging a second sequence having a phase opposite to a phase of the first sequence.

11. The method of claim 10, wherein the generating the short preamble comprises arranging the second sequence between the repeated first sequences and the long preamble.

12. The method of claim 8, wherein the determining comprises determining the number of repetitions of the first sequence in each of the n preambles based on a channel state.

13. The method of claim 8, wherein the number of repetitions for each preamble in the series of n preambles is twice as large as the number of repetitions for its immediate subsequent preamble in the series of n preambles.

\* \* \* \* \*